United States Patent Office.

CARL PETER HERMANN AHRLE, OF FRANKFORT-ON-THE-MAIN, GERMANY, ASSIGNOR TO METALLINE-PLATTEN-GESELLSCHAFT M. B. H., OF FRANKFORT-ON-THE-MAIN, GERMANY.

PROCESS OF BRONZING PHOTOGRAPHIC PLATES.

SPECIFICATION forming part of Letters Patent No. 694,227, dated February 25, 1902.

Application filed May 17, 1901. Serial No. 60,729. (No specimens.)

*To all whom it may concern:*

Be it known that I, CARL PETER HERMANN AHRLE, a subject of the King of Prussia, German Emperor, residing at 32 Sandweg, Frankfort-on-the-Main, in the Kingdom of Prussia, Germany, have invented certain new and useful Improvements in Processes of Producing Bronze-Coated Plates for Photographic Backgrounds, (for which I have filed an application for Letters Patent in Germany January 31, 1901; in Great Britain March 25, 1901; in Austria March 11, 1901; in Belgium April 10, 1901; in Hungary March 2, 1901; in France April 22, 1901; in Italy April 22, 1901; in Russia March 8, 1901; in Denmark March 18, 1901; in Spain April 22, 1901; in Sweden March 18, 1901; in Luxemburg March 8, 1901; in Norway April 24, 1901, and in Switzerland April 22, 1901;) and I do hereby declare the following to be a full, clear, and exact description of the invention, such as will enable others skilled in the art to which it appertains to make and use the same.

My invention relates to a process for the production of bronze-coated plates to serve as a photographic background, which plates are produced in the manner herein set forth in the description and claims.

Hitherto many attempts have been made to produce bronze coating for photographic backgrounds; but up to the present time none have proved satisfactory, one reason for this being that pliable materials—such as paper, textile fabrics, leather, or the like—have been employed, to all of which materials serious objections exist. I have found it to be a prerequisite that the base must be of rigid material; otherwise the coating will not be durable and homogeneous.

A bronze coating secured to paper or other fabric by means of gelatin having incorporated therein a metallic substance in the condition of a fine powder is not durable, since the flexibility of the paper or fabric inevitably causes cracks or flaws in the metallic layer. Moreover, a layer produced by bronze incorporated into gelatin, even if supported by a rigid body, is not durable for this purpose on account of the change in the temperature and the hygroscopic condition of the atmosphere. Even if such coatings are covered with collodion varnish they will not be satisfactory, as the objection of brittleness still obtains even to a greater degree.

According to my process I take as the base some rigid material—such as wood, marble, metal, or the like—and add to it a suitable layer of varnish, preferably japan. This layer of varnish is then dried, smoothed, and polished. I then take a solution containing the following parts, by weight: sixteen of albumen, nine of honey, twenty-three of water. These materials are thoroughly mixed together and carefully filtered. The plate covered with this varnish coating is then coated with this filtered solution, which penetrates into the fine pores of the varnish, thus effecting a thorough combination between the solution and varnish. Before the solution has become perfectly dry the "metallizing" or bronzing should be effected. This is done as follows: The fine dry bronze-powder is applied with a fine brush to the slightly-moist surface of the plate, the application being continued until a uniform bronze layer is produced having a metallic luster and thoroughly combined with the coating formed on the layer of varnish by the solution. In this manner by the introduction of fine metallic particles into the solution and the varnish coating the varnish, the solution, and the bronze-powder form a thoroughly-homogeneous layer. This is then allowed to dry and alcohol is poured over it, which by its evaporation hardens the layer. The plate thus produced forms an admirable background for photographic purposes. The pictures formed thereon remain unaltered and are so perfect as to produce on the eye the impression of a plastic production.

Having thus described my invention, what I claim as new, and desire to secure by Letters Patent of the United States, is—

1. The process of producing bronze-coated plates for photographic purposes, which consists in applying to a rigid base a layer of varnish, a softening solution, and fine metallic powder in succession.

2. The process of producing bronze-coated plates for photographic purposes, which consists in applying to a rigid base, varnish, a solution containing albumen, honey and water, and metallic powder in succession.

3. The process of producing bronze-coated plates for photographic purposes, which consists in applying to a rigid plate a layer of varnish, smoothing and polishing the same, then applying a solution composed of albumen, honey and water, and then while still wet brushing a dry metallic powder over the surface thereof, allowing it to dry, and applying alcohol thereto.

In testimony whereof I have affixed my signature in presence of two witnesses.

CARL PETER HERMANN AHRLE.

Witnesses:
JEAN GRUND,
CARL GRUND.